Jan. 12, 1932.  A. LENNING ET AL  1,841,136
REFRIGERATION
Filed Jan. 4, 1929   2 Sheets-Sheet 1

INVENTORS
their ATTORNEY

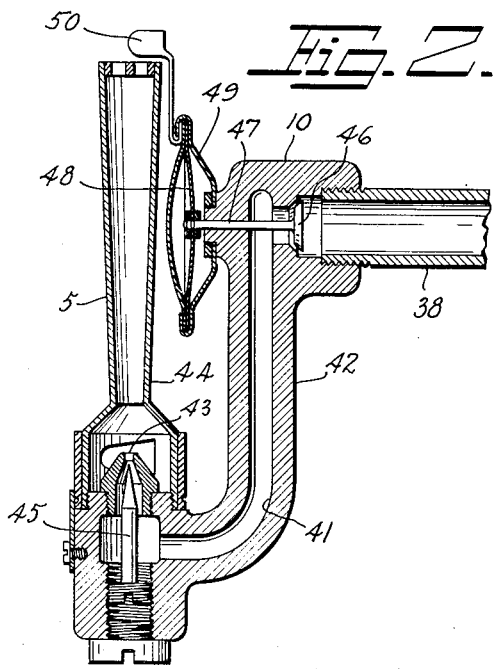
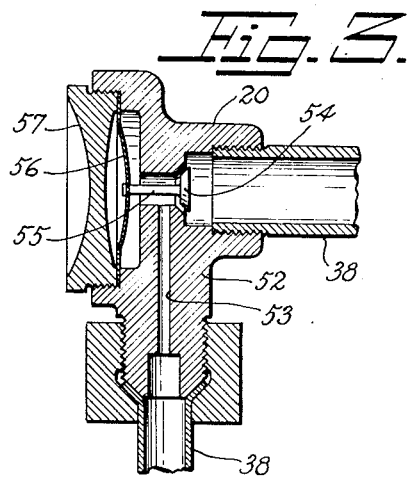
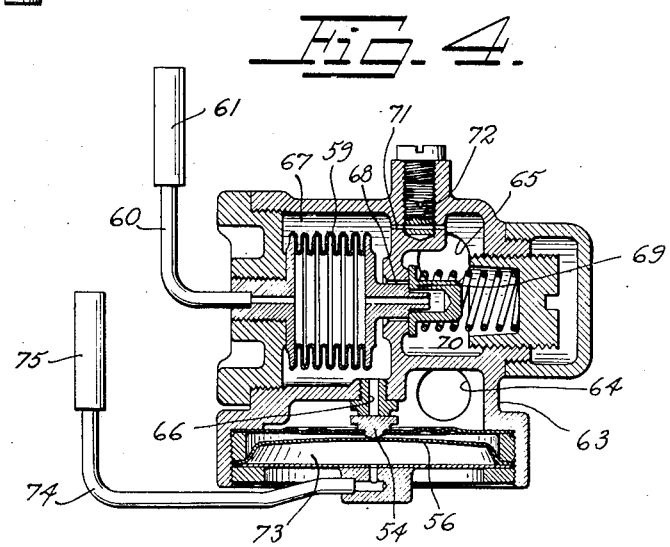

Patented Jan. 12, 1932

1,841,136

UNITED STATES PATENT OFFICE

ALVAR LENNING AND ROBERT SETH TAYLOR, OF NEW YORK, N. Y., ASSIGNORS TO ELECTROLUX SERVEL CORPORATION, OF NEW YORK, N. Y., A CORPORATION OF DELAWARE

REFRIGERATION

Application filed January 4, 1929. Serial No. 330,222.

Our invention relates to absorption refrigerating apparati to which heat is added and heat is rejected, the heat added being derived from the combustion of gaseous fuel and the heat rejected being removed into cooling water or other like medium.

The object of the invention is to combine adequate and efficient regulation of such apparati with safety features preventing the occurrence of unnatural and undesirable conditions, coordinated into an efficient combination of proper cooperating parts.

The invention will be described in connection with the accompanying drawings on which:

Fig. 2 shows a burner and valve assembly constituting part of the combination shown in Fig. 1;

Fig. 3 shows a valve forming a part of the combination of Fig. 1 and operating in conjunction with the burner and valve assembly shown in Fig. 1; and Fig. 4 shows a combined multiple valve unit constituting an alternative embodiment which may be used in lieu of separate parts shown in Fig. 1.

Figure 1:
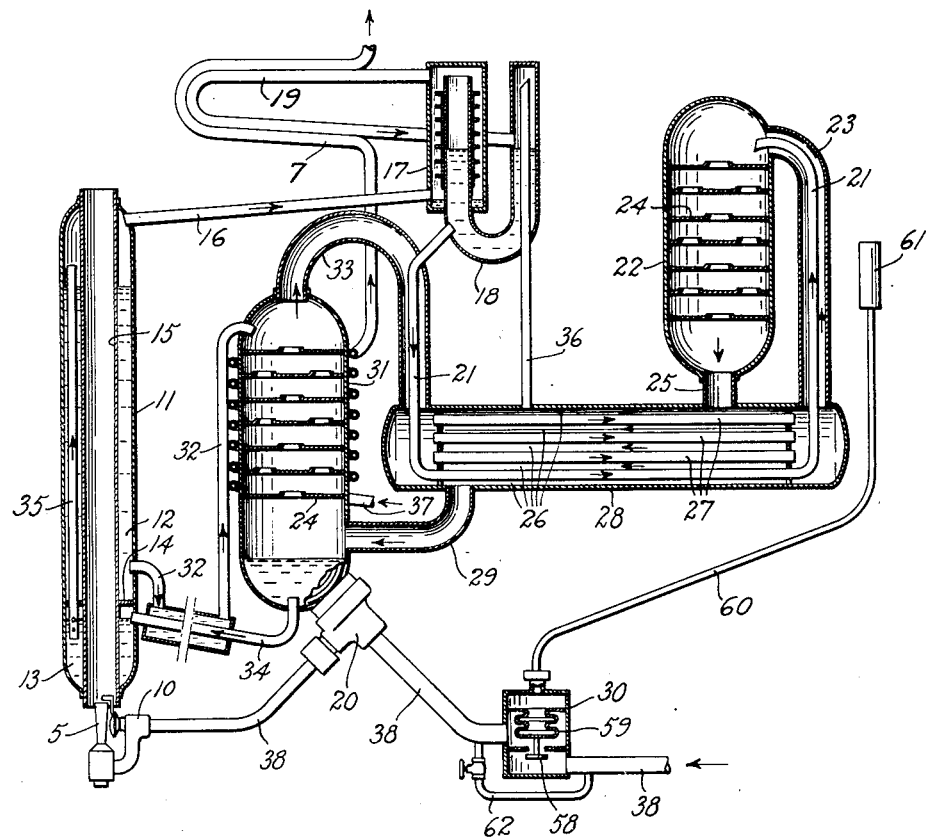
Fig. 1 shows, more or less diagrammatically, a system of apparatus to which our invention may be applied and the application of our invention thereto.

Referring more particularly to Fig. 1, the system shown comprises a generator 11 comprising a main generator chamber 12 and an auxiliary generator chamber 13 separated by a partition 14. A central flue 15 extends upwardly through the auxiliary generator chamber and the main generator chamber. A burner 5 is directed into the lower end of the flue and serves to heat the generator to generate vapor in the main generator chamber and in the auxiliary generator chamber.

The generator contains a solution of refrigerant in absorption liquid, preferably ammonia in water. It will be understood that various fluids may be used in the system and that we are specifically describing one system in order to provide an understanding of one preferred application of the invention although the invention may be used with many different kinds of systems.

Ammonia vapor produced in the generator passes through conduit 16 and into rectifier 17 where entrained vapor of water is condensed and caused to return back toward the generator. Ammonia in U-shaped member 18 serves to cause rectification. Vapor leaving rectifier 17 passes into condenser 19 and is condensed by cooling water flowing through conduit 7. Condensed ammonia collects in U-shaped member 18 and thence flows through conduit 21 into evaporator 22, which is arranged in heat exchange relation with the objective of refrigeration. In the evaporator the liquid ammonia meets an inert gas, preferably hydrogen, entering the evaporator from conduit 23 and the ammonia diffuses into the hydrogen and evaporates and, due to its evaporation, takes up heat from the surroundings. The evaporator is equipped with disks 24 over which the liquid refrigerant cascades downwardly. The mixture of ammonia vapor and hydrogen gas formed in the evaporator passes through connection 25 and through the space 26 formed around tubes 27 in heat exchanger 28 and thence through conduit 29 into absorber 31.

Absorber 31 also contains disks 24. Weak absorption liquid enters the absorber from conduit 32 and cascades downwardly over disks 24 absorbing the ammonia and liberating the hydrogen. The hydrogen flows out of the absorber through conduit 33 and thence through tubes 27 and through conduit 23 back to the evaporator.

The circulation of gaseous fluid between the evaporator and absorber is caused by differences of specific gravity of different vertically extending columns of the gaseous fluid. Strong absorption liquid flows through conduit 34 and into auxiliary generator chamber 13 whence it is lifted due to the vapor formed therein through conduit 35 and into the main generator chamber. Weak absorption liquid flows through conduit 32 in heat exchange relation with the liquid in conduit 34 and into the top of the absorber.

A pipe 36 serves to remove inert gas from the rectifier and conduct it to the evaporator-absorber cycle.

A cooling water conduit 37 is wound around absorber 31 and soldered or welded thereto to give heat transmission. Conduit 32 is soldered to turns of the cooling water coil 37 in order to precool the weak absorption liquid before entering the absorber.

It will be seen that generator 11 is a high temperature heat-receiving part; that evaporator 22 is a low temperature heat-receiving part; that absorber 31 is a heat-rejecting part; and that condenser 19 is a heat-rejecting part.

Gas for heating the generator is supplied through conduit 38. In conduit 38 there are three valves in series, valve 10, valve 20 and valve 30. Valve 10 is shown in detail in Fig. 2 and valve 20 is shown in detail in Fig. 3.

Referring to Fig. 2, gas passes to the burner 5 through channel 41 in burner casting 42. The gas discharges through an orifice 43 and is mixed with air in mixing tube 44 to form a combustible mixture. An adjustable needle valve 45 may be used to vary the flow through orifice 43. Valve 10 is formed in the upper part of casting 42 and comprises a valve disk 46 mounted on a stem 47 which is attached to a snap-disk 48, preferably of the type known as the Klixon disk. This disk is mounted on casting 42 by mounting 49 to which is attached a member 50 arranged to transmit the heat of the burner flame to the Klixon disk.

The operation of this device is as follows:

The Klixon disk is of such nature that at room temperature valve 10 is closed, disk 46 being on its seat. When the temperature adjacent the burner rises to a given value so that heat transmitted through member 50 raises the temperature of the disk above a given value the disk snaps and opens valve 10, disk 46 being then off its seat so that gas can flow to the burner. In starting the heating, a match is lighted and held under the Klixon disk until it snaps valve 10 open at which time the burner is lighted. Should the burner then for any reason go out the temperature will fall and disk 48 will become cool and cause valve 10 to snap to closed position, cutting off the gas supply.

Referring to Fig. 3, casting 52 comprises a passage 53 which forms a part of conduit 38. Valve disk 54 attached to stem 55 is moved by Klixon disk 56 to open and close a valve port to maintain open or closed flow through conduit 38. Adjacent disk 56 is a member 57 having a curved outside surface attached to fit to the absorber shell and to be welded in tight contact thereto.

It is desirable that the supply of gas to the gas burner be cut off in event that cooling water ceases flowing through conduits 37 and 7. Failure of the water supply results in rise of temperature in the absorber. The rise of temperature is transmitted through member 57 of Fig. 3 and, when the temperature has arisen above a given value, disk 56 snaps valve disk 54 onto its seat, closing the valve 20, thus cutting off the gas supply. As the temperature lowers below a given value due to stoppage of the heat supply, valve disk 56 snaps back to open valve 20 but by this time valve 10 has become closed due to the drop of temperature adjacent the burner and so conduit 38 is cut off due to the operation of valve 20 although valve 20 opens after being closed. When the cooling water is re-supplied in order to start the aparatus it is necessary to heat up the Klixon disk attached to valve 10 in order to permit gas to flow through conduit 38.

Valve 30 and the means for controlling the same are known and this valve is only diagrammatically indicated in Fig. 1. The valve comprises a valve disk 58 operated by a bellows 59 responsive to temperature of a volatile fluid in tube 60 and bulb 61. Bulb 61 is situated adjacent the evaporator in heat exchange relation with the food space or substance to be refrigerated. Valve 30 is a regulating valve having variable movements as distinguished from the full-close and full-open movements of valves 10 and 20. As the temperature rises in the food space, the fluid within bulb 61 and tube 60 expands, causing an increase of the opening of the valve to admit more gas. Conversely a drop in temperature causes a diminution of flow. This valve is preferably so arranged that the flow through the same never goes below a certain minimum amount. This may be taken care of by having a by-pass around the valve as indicated at 62.

In normal operation valves 10 and 20 are both open and valve 30 throttles the flow of gas to an amount comensurate with demand for refrigeration.

Fig. 4 shows an arrangement wherein valves 20 and 30 are combined into a unitary structure. Housing 63 has a gas inlet 64 and a gas outlet 65. The gas flows past valve member 54, through passageway 66, through chamber 67, through passage 68 controlled by valve member 69, through chamber 70 and thence out through the gas outlet 65. Valve member 54 is normally off its seat and corresponds to valve 54 of Fig. 3. The gas flow is normally regulated by valve member 69 which is moved by bellows 59 in response to variations of pressure in bulb 61 and tube 60 occasioned by variations of temperature in the space to be refrigerated. A by-pass 71 is provided and may be adjusted by setscrew 72. Member 54 is snapped open or shut by a disk 56 on one side of which is a chamber 73 connected by a tube 74 to a bulb 75. Bulb 75 and tube 74 contain a volatile liquid and variations of temperature of bulb 75 cause an opening or closing of valve member 54 in similar manner to that of the arrangement in Fig. 3. Instead of controlling this cut-off arrangement by the absorber temperature it can be controlled by the condenser temperature, bulb 75 being placed adjacent condenser 19. It will be obvious that the operation will be the same. With the arrangement shown in Fig. 4, the burner and valve 10 of Fig. 2 may be used.

It will be noted that the closing of either valve 20 by disk 56 in Fig. 3 or valve passage 66 by disk 56 in Fig. 4 is a sudden closing so that when the temperature of the heat rejecting part rises above a given value the valve closes immediately.

Having thus described our invention, what we claim is:

1. Refrigerating apparatus comprising a heat-receiving part, a heat-rejecting part, a gas burner adjacent the heat-receiving part, a gas supply conduit connected to the burner, a valve in the gas supply conduit operative to close the gas supply when the temperature adjacent the burner falls below a given value, and a second valve in said conduit responsive to temperature of said heat-rejecting part and operative to close when the temperature of the heat-rejecting part rises above a given value and to open when the temperature of the heat-rejecting part falls below a given value.

2. Refrigerating apparatus comprising a generator, an absorber, a gas burner for heating the generator, a gas supply conduit connected to the gas burner, a valve in the gas supply conduit operative to close if the burner flame is extinguished and a second valve in the gas supply conduit in series with the first-mentioned valve responsive to temperature of the absorber and operative to close when the temperature of the absorber rises above the given value and to open when the temperature of the absorber falls below a given value.

3. Refrigerating apparatus comprising a generator, a heat-rejecting part, cooling water conducting means for cooling the heat-rejecting part, a gas burner for heating the generator, a gas supply conduit connected to the gas burner, a valve in the gas supply conduit operative to stop the flow of gas therethrough if the burner goes out and a second valve in the gas supply conduit operative to stop the flow of gas therethrough when the temperature of the heat-rejecting part rises above a given value and to permit the flow of gas therethrough when the temperature of the heat-rejecting part falls below a given value.

4. Refrigerating apparatus comprising a heat-receiving part, a heat-rejecting part, a gas burner adjacent the heat-receiving part, a gas supply conduit connected to the burner, a valve in the gas supply conduit operative to close the gas supply when the temperature adjacent the burner falls below a given value, a second valve in said conduit responsive to temperature of said heat-rejecting part and operative to suddenly close when the temperature of the heat-rejecting part rises above a given value and to open when the temperature of the heat-rejecting part falls below a given value.

5. Refrigerating apparatus comprising a generator, a heat-rejecting part, cooling water conducting means for cooling the heat-rejecting part, a gas burner for heating the generator, a gas supply conduit connected to the gas burner, a valve in the gas supply conduit operative to stop the flow of gas therethrough if the burner goes out and a second valve in the gas supply conduit operative to suddenly stop the flow of gas therethrough when the temperature of the heat-rejecting part rises above a given value and to permit the flow of gas therethrough when the temperature of the heat-rejecting part falls below a given value.

6. Refrigerating apparatus comprising a generator, an evaporator, an absorber, a gas burner for heating the generator, a gas supply conduit connected to the burner, a valve mechanism in said conduit operative to stop the flow therethrough when the temperature adjacent the burner drops below a given value, a second valve mechanism in said conduit comprising two valve elements, means responsive to temperature variations of said evaporator for actuating one of said elements, and means operative to close the other of said elements when the temperature of said absorber rises above a given value and to open said other of said elements when the temperature of the absorber falls below a given value.

7. Refrigerating apparatus comprising a generator, an evaporator, an absorber, a gas burner for heating the generator, a gas supply conduit connected to the burner, a valve in said conduit operative to stop the flow therethrough when the temperature adjacent the burner drops below a given value, a second valve in said conduit comprising two valve elements, means responsive to temperature variations of said evaporator for actuating one of said elements to regulate the flow of gas therethrough, and means operative to suddenly close the other of said elements when the temperature of said absorber rises above a given value and to open said other of said elements when the temperature of said absorber falls below a given value.

8. Refrigerating apparatus comprising a generator, an absorber having a liquid containing portion, a gas burner for heating the generator, a gas supply conduit connected to the gas burner, a valve in the gas supply conduit responsive to temperature of the burner flame, a second valve in the gas supply conduit in series with the first-mentioned valve, and temperature responsive means for operating said second valve, said means being in heat exchange relation with said liquid containing portion of the absorber and operable to close said second valve when the temperature of the liquid in said absorber rises above a given value and to open said second valve when the temperature of the liquid in said absorber falls below a given value.

9. Refrigerating apparatus comprising a generator, an absorber having a liquid containing portion, a gas burner for heating the generator, a gas supply conduit connected to the gas burner, a valve in the gas supply conduit operative to close upon extinguishment of the burner flame, a second valve in the gas supply conduit in series with the first-mentioned valve, and temperature responsive means for operating said second valve, said means being in heat exchange relation with said liquid containing portion of the absorber and operative to close said second valve if the temperature of the liquid in said absorber rises above a given value and to open said second valve when the temperature of the liquid in said absorber falls below a given value.

10. Refrigerating apparatus comprising a generator, an absorber having a liquid containing portion, a gas burner for heating the generator, a gas supply conduit connected to the gas burner, a valve in the gas conduit and temperature responsive means for operating said second valve, said means being in contact with said liquid containing portion of the absorber.

11. Refrigerating apparatus comprising a generator, an absorber having a liquid containing portion, a gas burner for heating the generator, a gas supply conduit connected to the gas burner, a valve in the gas conduit and temperature responsive means for operating said second valve, said means being in contact with said liquid containing portion of the absorber and operative to close said valve if the temperature of the liquid in said absorber rises above a given value.

In testimony whereof we have affixed our signatures.

ALVAR LENNING.
ROBERT SETH TAYLOR.